United States Patent [19]

Gerson

[11] Patent Number: 4,531,507
[45] Date of Patent: Jul. 30, 1985

[54] CHARCOAL LIGHTER DEVICE

[76] Inventor: Fred B. Gerson, 408 Sterling St., Jackson, Tenn. 38301

[21] Appl. No.: 600,121

[22] Filed: Apr. 13, 1984

[51] Int. Cl.³ .............................................. F24B 3/00
[52] U.S. Cl. .................................. 126/25 B; 126/162
[58] Field of Search ............................. 126/25 B, 162

[56] References Cited

U.S. PATENT DOCUMENTS

| | | | |
|---|---|---|---|
| 94,986 | 8/1869 | Van Hagen. | |
| 212,010 | 2/1879 | Jackson. | |
| 256,894 | 4/1882 | Hare. | |
| 422,763 | 3/1890 | Goodall. | |
| 654,849 | 7/1900 | Scully. | |
| 950,414 | 2/1910 | Sweley. | |
| 1,298,762 | 4/1919 | Milligan. | |
| 1,966,945 | 7/1934 | Bowers | 126/153 |
| 2,413,204 | 12/1946 | Wolff | 99/447 |
| 2,573,211 | 10/1951 | Manzler | 126/25 |
| 2,597,477 | 5/1952 | Haislip | 126/25 |
| 2,920,614 | 1/1960 | Phelps | 126/25 |
| 3,116,704 | 1/1964 | Byars, Sr. et al. | 110/1 |
| 3,167,040 | 1/1965 | Byars, Sr. et al. | 110/1 |
| 3,421,656 | 1/1969 | Asenbauer | 220/97 |
| 3,974,821 | 8/1976 | Storandt | 126/25 B |
| 4,023,553 | 5/1977 | London et al. | 126/25 B |
| 4,282,854 | 8/1981 | Byars | 126/25 B |
| 4,461,270 | 7/1984 | Sutter | 126/25 B |

Primary Examiner—Carroll B. Dority, Jr.
Attorney, Agent, or Firm—Lalos, Leeds, Keegan, Marsh, Bentzen & Kaye

[57] ABSTRACT

A charcoal lighter device having a tubular housing adapted to rest vertically on a support surface and a handle assembly positioned outside of and attached to the housing. A charcoal support grate fits in the housing and has a first edge pivoted in the housing and a second edge. A grate support finger is connected to the handle assembly and is positionable, by the movement of the handle assembly relative to the housing, between an extended grate support position and a grate release position. The second edge is positionable on the grate support finger such that the grate is in a generally horizontal charcoal support position spaced above the support surface when the grate support finger is in its grate support position, and the second edge pivots downwardly from said generally horizontal position to a charcoal dumping position when the grate support finger is subsequently moved to its grate release position, thereby safely dumping the lit charcoal into a barbecue grill positioned beneath it.

16 Claims, 5 Drawing Figures

CHARCOAL LIGHTER DEVICE

BACKGROUND OF THE INVENTION

This invention relates to fuel ignition devices, and more particularly to devices for igniting charcoal for use in a barbecue-type charcoal burner, which do not require the use of lighter fluids or electrical starting devices.

A number of conventional devices are known and available for quickly and easily igniting charcoal to be transferred to a barbecue-type charcoal burner after ignition. These devices typically include a tubular housing with a grate supported in the housing in a horizontal position and spaced above the lower housing support surface. Charcoal or similar type briquettes are placed on top of the grate and flammable material, such as crumpled newspaper, is placed in the housing beneath the grate, and the flammable material is then ignited. The housing acts as a flue to direct a velocity draft of heated air including flames and combustion gases from the ignited material through the grate and onto the charcoal briquettes seated on the grate. It is also known to include openings in the bottom of the housing adjacent the flammable materials such that air can pass through the openings into the housing thereby supplying oxygen to the burning flammable material and charcoal.

Once the charcoal was lit and it was desired, in the past, to move the charcoal to a different container such as a conventional barbecue-type grill, it was necessary to either tilt the entire housing thereby dumping the charcoal out the top or to provide a complicated means for pivoting the grate downwardly and dumping the charcoal out the bottom. The former method has proved to be unacceptable since sparks or lit charcoal pieces or entire briquettes frequently would fall out from either the top or bottom of the housing as the charcoal was dumped thereby injuring the user or bystanders, or requiring that the fallen pieces be later picked up. Regarding the latter method, no suitable means has been developed for simply, and easily dumping the grate downwardly. Prior devices frequently had loose parts or complicated designs, or required that the user grasp heated portions of the device.

OBJECTS OF THE INVENTION

Accordingly, it is the principal object of the present invention to provide an improved charcoal lighter device.

Another object of the present invention is to provide an improved handle assembly for a charcoal lighter device that is easier to hold and to support the charcoal lighter device when lifting it off of or placing it onto a support surface.

A further object of the present invention is to provide a novel charcoal lighter device that is simple of construction and operation.

A still further object of the present invention is to provide an improved charcoal lighter device that does not require the housing to be tilted when dumping the lit charcoal.

Another object is to provide an improved charcoal lighter device that minimizes the amount of sparks and lit charcoal pieces emitted from the device when dumping it thereby providing a safer, cleaner device.

A further object is to provide a charcoal lighter device having a novel means of supporting and releasing the charcoal support grate.

A still further object is to provide a novel charcoal lighter device that is simpler in design and has no loose parts.

Other objects and advantages of the present invention will become more apparent to those persons having ordinary skill in the art to which the present invention pertains from the foregoing description taken in conjunction with the accompanying drawings.

THE DRAWINGS

DESCRIPTION OF THE THE PREFERRED EMBODIMENT

Figure 1:
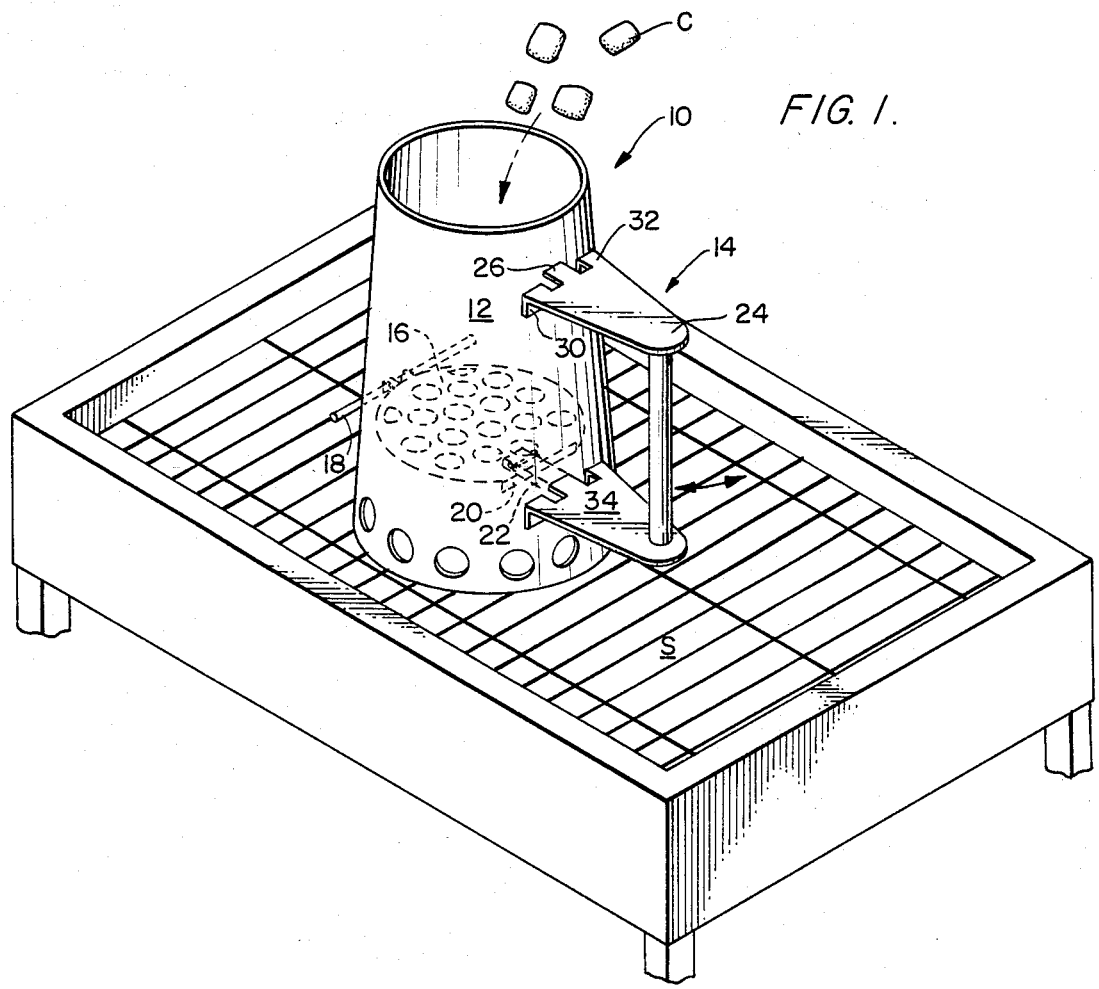
FIG. 1 is a perspective view of the present invention illustrated in its working environment.

Referring to FIG. 1, the preferred embodiment of the present charcoal lighter device is illustrated generally at 10, and is shown resting on a support surface S. Charcoal lighter device 10 comprises generally a tubular upwardly converging housing 12 formed of sheet steel or the like. A handle assembly shown generally at 14 is attached to one side of housing 12. A circular charcoal support grate 16 is positioned in a middle portion of tubular housing 12. A rod 18 is secured to one edge of grate 16 and passes through a pair of horizontally aligned openings in the tubular housing. The openings are large enough so that rod 18 can pivot freely in them thereby providing a pivot axis for the grate. Opposite the rod the generally circular grate is bent downwards to form a support ledge 20, which when the grate is horizontal is spaced from the inside of housing 12. Support ledge 20 is adapted to rest on and be supported by grate support finger 22.

Handle assembly 14 includes an upper generally horizontal bracket 24 having a pivotal support finger 26 passing through an opening in housing 12 and being secured in the housing by a cotter pin 28. Pivotal support finger 26 provides a pivoting axis so that the upper bracket can move between its positions in FIG. 4 and FIG. 5 relative to housing 12. Upper bracket 24 includes two angular abutments 30, 32 on either side of pivotal support finger 26 to abut against housing 12 as well as to help position the pivotal support finger in the opening. Handle assembly 14 further includes a lower bracket 34 similar to upper bracket 24 including angular abutments but including grate support finger 22 instead of pivotal support finger 26 which is mounted to and extends from the middle of the lower bracket through an opening in the housing a distance into the housing. Grate support finger 22 is slideable in the opening in the housing such that when the lower portion of handle assembly 14 is pulled away from tubular housing 12, such as is best illustrated in FIGS. 3 and 5, grate support finger 22 is pulled towards the outside of the housing but is restrained from passing entirely through the opening to the exterior of the housing by a cotter pin 36.

Figure 3:
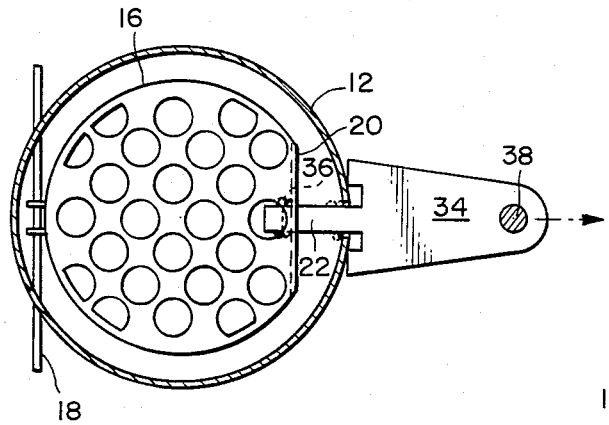
FIG. 3 is a cross sectional view taken along line 3—3 of FIG. 2.
Figure 4:
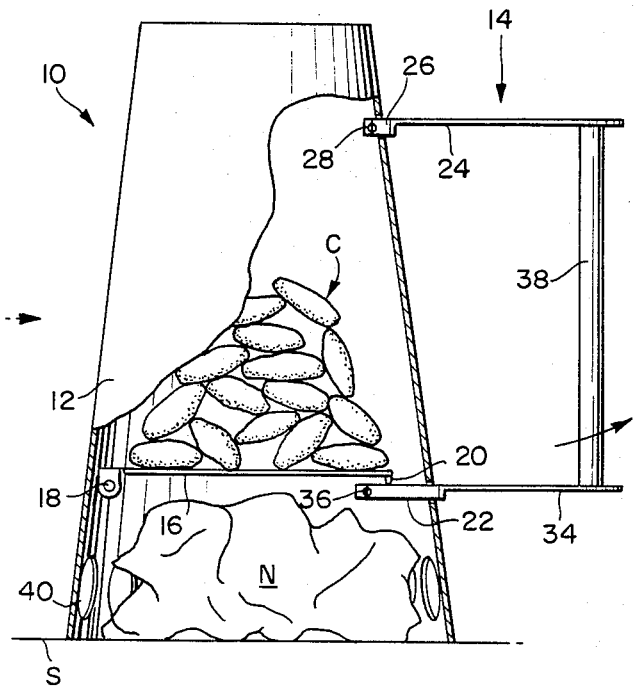
FIG. 4 is a side elevational view similar to that of FIG. 2 illustrating the use of the present invention in its grate support position.
Figure 5:
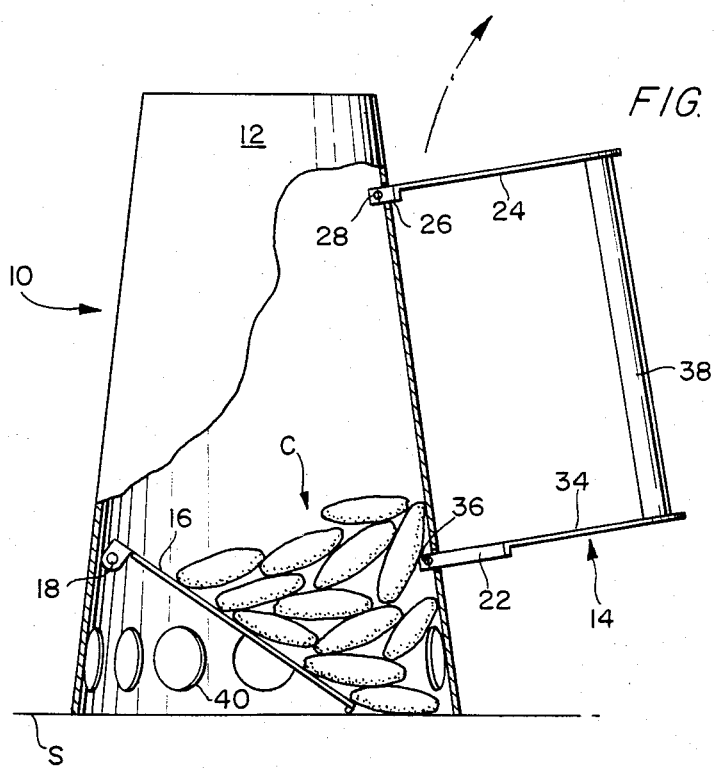
FIG. 5 is a view similar to FIG. 4 illustrating the device in its grate release position.

When in its normal grate support position it extends a distance into the housing sufficient to fully support the grate support ledge 20 as shown in FIGS. 3 and 4. However, when the handle assembly is pulled away from the housing and the grate support finger is pulled further outside the housing, the finger becomes disengaged from the grate support ledge and grate 16 pivots about rod 18 due to the weight of gravity pulling down on it.

A sturdy wood handle 38 extends between the upper and lower brackets 24, 34 and is secured thereto by any suitable means such as screws or the like. When grate support finger 22 is in the grate support position, handle 38 is in a vertical position as illustrated in FIG. 4, but when the grate support finger is moved to its grate release position by pulling the bottom portion of the handle as shown in FIG. 5, the handle is in a slightly inclined position relative to the housing. It is further within the scope of the present invention for the handle assembly to include a protective heat shield (not shown) positioned between the handle and the housing to protect the user's hand when grasping the handle.

Figure 2:
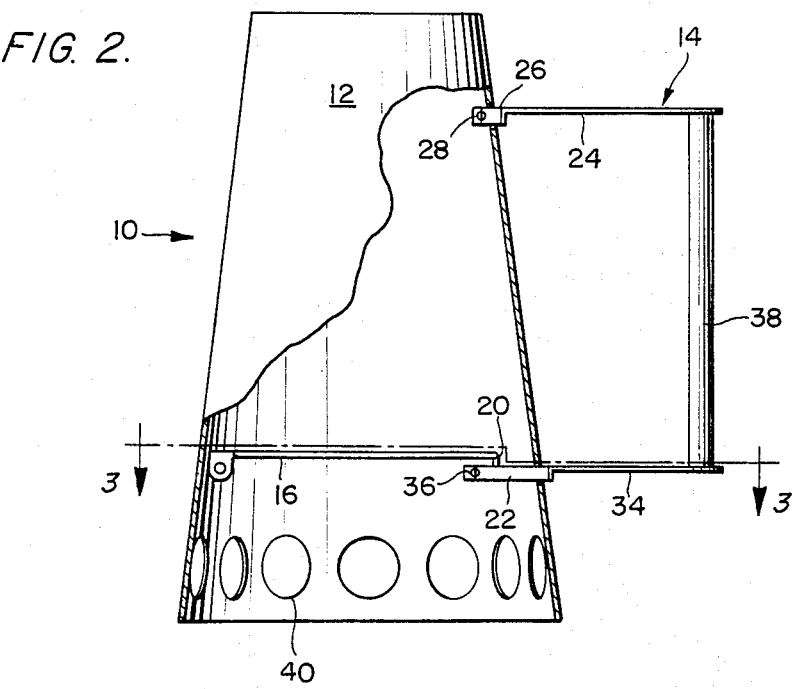
FIG. 2 is a side elevational view of the device of FIG. 1 with portions thereof broken away.

Thus, charcoal lighter device 10 operates as follows: grate support finger 22 is pulled to its grate release position by pulling the lower portion of handle 38 away from housing 12, grate 16 is raised to a generally horizontal position and grate support finger 22 is then moved to its grate support position such as shown in FIG. 2. Crumpled newspaper N (one double sheet should be sufficient) or the like is placed in the chamber formed by tubular housing 12 below grate 16 and above support surface S, which preferably is a closed surface such as a large piece of aluminum foil. Charcoal briquettes C are then placed on top of the grate, as best shown in FIG. 4. The newspaper is lit and tubular housing 12 acts as a chimney drawing air through the air openings 40 spaced about the lower portion of the tubular housing past the ignited newspaper N and causing a draft of combustion gases and heated material up through grate 16 to the charcoal briquettes C which are thereby ignited. When it is determined that the briquettes have become sufficiently lighted, the lower portion of the handle 38, as illustrated by the arrow in FIG. 4, is pulled away from the tubular housing to the position of FIG. 5. As is evident from FIG. 3, grate support finger 22 then becomes disengaged from grate 16 and the grate pivots by gravity about its pivot rod 18 to the charcoal dumping position illustrated in FIG. 5. Then by lifting handle 38 and thus device 10 off of support surface S, the grate continues pivoting to a more generally vertical position and all of the charcoal briquettes C pass through the bottom opening in the housing. Also, as the device is lifted off of its support surface the lower portion of the handle moves in towards the housing thereby assuming a more vertical position. As is evident the briquettes are now lit and in the grill and ready for use. The charcoal lighter device carried by its handle is then relocated to its storage position.

Instead of dumping the charcoal out of the device, the lit charcoal can remain on the grate in the housing and a grill (not shown) placed directly on top of the housing. Hot dogs, hamburgers or the like can then be directly cooked on the grill or a frying pan placed on the grill and foods conveniently cooked in the pan directly on the present device.

From the foregoing detailed description, it will be evident that there are a number of changes, adaptations, and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A charcoal lighter device comprising:
   a tubular housing adapted to rest vertically on a support surface,
   a handle assembly positioned outside of and attached to said housing,
   a grate having a first edge pivoted in said housing and an opposite second edge, and
   a pivoting means for pivoting said first edge to said housing,
   a grate support finger connected to said handle assembly and positionable, by the movement of said handle assembly relative to said housing, between an extended grate support position and a grate release position,
   said second edge being positionable on said grate support finger such that said grate is in a generally horizontal charcoal support position spaced above the support surface when said grate support finger is in said grate support position, and said second edge pivoting downwardly from said generally horizontal position to a charcoal dumping position when said grate support finger is moved to said grate release position,
   said second edge including an edge member extending generally perpendicularly down from said grate and adapted to rest on said grate support finger when said grate support finger is in said grate support position, and positioned to be spaced a distance from the support surface so that said grate can freely pivot to said charcoal dumping position when said grate support finger is in said grate release position, even when said housing is resting on the support surface,
   said grate support finger being slidably positioned in a finger opening in said housing spaced above the lower surface of said housing,
   a blocking means attached to said grate support finger inside said housing and adapted to prevent said grate support finger from being pulled entirely out through said finger opening to the outside of said housing when said grate support finger is in said grate release position,
   said handle assembly including an upper bracket connected to said housing, a lower bracket spaced below said upper bracket and connected to said grate support finger, and a generally vertical handle extending between and mounted to said upper bracket and said lower bracket, and
   said blocking means allowing said handle to be generally parallel to the longitudinal axis of said housing when said housing has been fully lifted off of the support surface by a user grasping and lifting said handle.

2. The device of claim 1 including,
   said lower bracket including at least one abutment member that generally abuts against said housing when said grate support finger is in said grate support position, and
   said lower bracket being connected to said housing.

3. The device of claim 1 including, said handle being vertically disposed when said grate support finger is in said grate support position and said housing rests on the support surface.

4. The device of claim 1 including,
said handle including a lower handle portion, and
said lower handle portion being spaced a first distance from said housing when said grate support finger is in said grate support position and spaced a second distance greater than said first distance from said housing when said grate support finger is in said grate release position.

5. The device of claim 4 including,
said lower portion of said handle moving in towards said housing as said housing is lifted off of the support surface.

6. The device of claim 1 including,
said upper bracket being pivotally connected to said housing.

7. The device of claim 1 including,
said blocking means comprising a pin means attached to said grate support finger inside said housing.

8. The device of claim 1 including,
said grate support finger being movable between said grate support position and said grate release position when said housing rests on the support surface.

9. The device of claim 1 including,
said housing being upwardly tapering.

10. The device of claim 1 including,
said housing including a plurality of air intake apertures at its lower portion below said grate, and below said finger opening.

11. The device of claim 1 including,
said second edge being spaced from said housing when said grate is in said generally horizontal charcoal support position.

12. The device of claim 1 including,
an upper bracket connecting means positioned in the same vertical plane as the longitudinal axis of said housing, the longitudinal axis of said handle, and the axis of said grate support finger for connecting said upper bracket to said housing.

13. The device of claim 1 including,
said upper bracket including an upper bracket connecting means which includes an upper bracket finger extending through and adapted to move relative to an upper housing opening through said housing and an upper blocking means attached to said upper bracket finger in the interior of said housing and configured to prevent said upper bracket finger from being pulled entirely out through said upper housing opening to the outside of said housing.

14. The device of claim 1 including,
a pivotal connecting means for pivotally connecting said upper bracket to said housing.

15. The device of claim 1 including,
said lower bracket being positioned in the same generally horizontal plane as said grate support finger.

16. The device of claim 1 including,
said grate support finger being perpendicular to said handle.

* * * * *